(12) United States Patent
Klein

(10) Patent No.: US 6,772,788 B1
(45) Date of Patent: Aug. 10, 2004

(54) PRESSURE CONTROL VALVE

(75) Inventor: Andreas Klein, Bad Homburg (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 153 days.

(21) Appl. No.: 10/049,930

(22) PCT Filed: Aug. 22, 2000

(86) PCT No.: PCT/EP00/08151

§ 371 (c)(1),
(2), (4) Date: Feb. 20, 2002

(87) PCT Pub. No.: WO01/14191

PCT Pub. Date: Mar. 1, 2001

(30) Foreign Application Priority Data

| Aug. 25, 1999 | (DE) | ......................................... 199 40 257 |
| Feb. 8, 2000 | (DE) | ......................................... 100 05 489 |

(51) Int. Cl.[7] ............................................. F16K 37/00
(52) U.S. Cl. ........................... 137/557; 73/714; 73/715; 73/753; 73/756; 303/119.2
(58) Field of Search ....................... 137/557; 303/119.1, 303/119.2, 119.3; 73/714, 715, 744, 745, 753, 756

(56) References Cited

U.S. PATENT DOCUMENTS

| 6,116,269 A | * | 9/2000 | Maxson ....................... 137/557 |
| 6,155,257 A | * | 12/2000 | Lurie et al. ............. 128/204.23 |
| 6,298,731 B1 | * | 10/2001 | Wade et al. .................. 73/756 |
| 6,374,679 B1 | * | 4/2002 | Babala et al. .................. 73/715 |
| 2002/0047304 A1 | * | 4/2002 | Bolitho et al. ........... 303/119.2 |

FOREIGN PATENT DOCUMENTS

| DE | 35 30 160 | 3/1987 |
| DE | 42 28 307 | 3/1994 |
| DE | 44 11 100 | 10/1995 |
| DE | 198 49 287 | 1/2000 |
| WO | 96/33080 | 10/1996 |
| WO | 97/00433 | 1/1997 |
| WO | 00/02755 | 1/2000 |

* cited by examiner

*Primary Examiner*—John Rivell
(74) *Attorney, Agent, or Firm*—Rader, Fishman & Grauer PLLC

(57) ABSTRACT

The present invention relates to a pressure control valve, in particular for electrohydraulic brake systems, including a valve member arranged in a valve housing and a sensor element for determining the fluid pressure that prevails in the valve housing. The fluid pressure in the valve housing is indirectly determined by the sensor element by way of the deformation of the valve housing.

9 Claims, 1 Drawing Sheet

PRESSURE CONTROL VALVE

TECHNICAL FIELD

The present invention generally relates to valves and more particularly relates to a pressure control valve for use in electrohydraulic brake systems.

BACKGROUND OF THE INVENTION

WO 00/02755A which was published after the priority date of the present invention discloses a pressure control valve of this type which includes a valve member arranged in a valve housing and a sensor element for determining the fluid pressure that prevails in the valve housing. The fluid pressure is determined directly by the arrangement of the sensor element in the valve housing, to what end corresponding structural provisions are necessary which also affect the overall dimensions of the pressure control valve. Due to the relatively high operating pressure, a correspondingly expensive sensor system is generally required which is permanently exposed to high pressures.

From generic publication WO 96/33080A a brake system with an electronic brake pressure control is known which is equipped with an impact sound sensor by means of which the change-over behavior of several pressure control valves of the brake system is established for the approximate determination of the brake pressure that prevails in a brake pressure generator and/or in several wheel brakes. To this end, the impact sound sensor is respectively arranged at a location of the valve housing of a pressure control valve such that the impact sound which is caused when a valve tappet or a valve head gets into contact on the valve housing is transmitted undamped to the impact sound sensor. Consequently, the impact sound sensor exclusively senses the vibrations which are transmitted onto the valve housing by the mechanical impulse of the moved valve components.

DE 198 30 464 A1 discloses a pressure control valve of this type which includes a valve member arranged in a valve housing and a sensor element for determining the fluid pressure that prevails in the valve housing. The fluid pressure is determined directly by the arrangement of the sensor element in the valve housing, to what end corresponding structural provisions are necessary which also affect the overall dimensions of the pressure control valve. Due to the relatively high operating pressure, a correspondingly expensive sensor system is generally required which is permanently exposed to high pressures.

In view of the above, an object of the present invention is to configure a pressure control valve of the type initially referred to in such a way that a low-cost determination of the hydraulic pressure that acts in the pressure control valve is ensured by entailing relatively low structural and functional efforts.

DETAILED DESCRIPTION OF THE PREFERRED EMBODIMENTS

Figure 1:
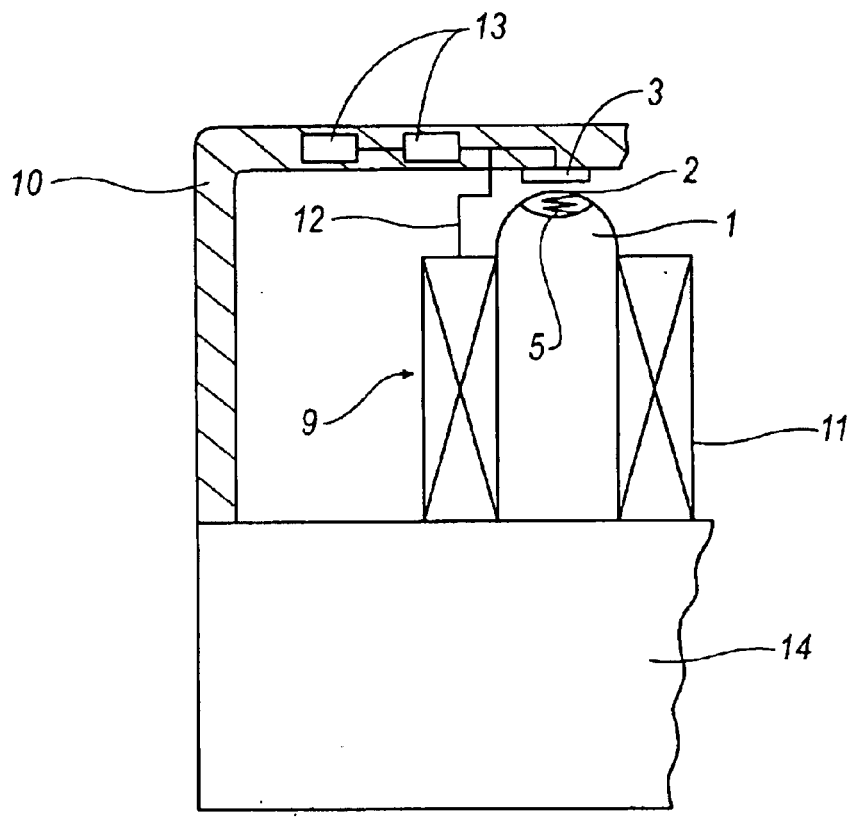
FIG. 1 is a basic circuit diagram of the sensor assembly that is essential to the present invention.

FIG. 1 shows a simplified view of a pressure control valve 9 which is arranged in a block-shaped valve-accommodating member 14 and is especially suited for use in electrohydraulic brake systems. The pressure control valve 9 accommodates in a valve housing 1 a valve member which is adapted to close or open the pressure fluid channels disposed in the valve accommodating member 14 by way of the electromagnetic actuation of a valve coil 11.

Further, a sensor element 2 is arranged above the valve coil 11 on the outside of the dome-shaped valve sleeve area. Sensor element 2 is used to determine the fluid pressure which prevails in the pressure control valve 9. According to the present invention, the fluid pressure in the valve housing 1 is indirectly sensed by the sensor element 2 by way of the measurement of the deformation of the valve housing. As regards the design of the sensor element 2, it becomes apparent from FIG. 1 that a wire strain gauge 5 is fitted to the dome-shaped portion of the valve housing 1 and, in conjunction with a gauge ring 6 and reference ring 7 that will be illustrated in the following in FIG. 2, forms a measuring element 4 which, by way of exciter ring 8, senses a signal representative of the deformation of the valve housing in the event of hydraulic pressure variation and transforms it into a pressure signal by way of an appropriate sensing, and evaluating circuit.

According to FIG. 1, the signal-receiving and exciter assembly 3 is mounted directly on a cover 10 which also accommodates the controlling and/or regulating electronics 13 that is required for the operation of the pressure control valve 9. Electronics 13 is connected electrically and also mechanically by way of the electric contacts 12 of the valve coil 11. Valve coil 11, the controlling and/or regulating electronics 13, and the signal-receiving and exciter assembly 3 are thus combined to form a prefabricated assembly in the cover 10. Cover 10 is seated on the valve-accommodating member 14 that carries the pressure control valve 9. It can be seen in the drawing of FIG. 1 that the sensor element 2 is isolated by an air gap from the signal-receiving and exciter assembly 3 so that a non-contact signal transmission occurs between a measuring element 4, that is integrated in the sensor element 2 and fitted to the pressure control valve 9, and the signal-receiving and exciter assembly 3 in which the sensor signal characterizing the valve housing deformation is transformed into a pressure signal. Therefore, it is proposed for the operation of the sensor element 2 that the signal-receiving and exciter assembly 3 causes induction of an electric voltage in a receiving circuit integrated in the sensor element 2, the said voltage permitting the operation of the measuring element 4 associated with the sensor element 2.

Upon request or requirement, the sensor element 2 and the signal-receiving and exciter assembly 3 may be provided with a corresponding signal amplifying and/or compensating circuit in order to stabilize the quality of signal transmission.

With a view to ensuring a precisest possible signal determination and signal transmission with respect to possible air gap tolerances between the sensor element 2 and the signal-receiving and exciter assembly 3, it is disclosed that the sensor element 2 is not only equipped with a measuring element 4 but with a suitable reference circuit in addition.

A specific embodiment which ensures a stable signal transmission quality irrespective of the size of the air gap that exists between the valve dome and the cover 10 shall be represented in the following by way of FIG. 2.

Figure 2:
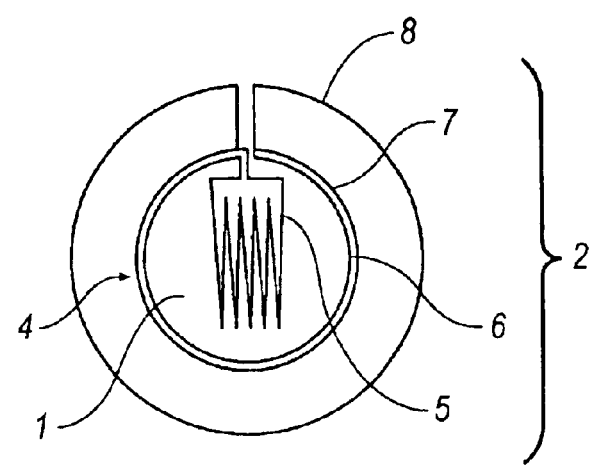
FIG. 2 shows an embodiment for the design, of a sensor element for the assembly presented in FIG. 1.

FIG. 2 shows an expedient design of the sensor element 2 which is hinted at in FIG. 1 already. The ;sensor element 2 is shown in a top view on the valve dome of the valve housing 1. The valve dome represents the area of the pressure control valve 9 which is sensitive to deformation under the effect of the hydraulic pressure.

The sensor element 2 which is aligned concentrically to the valve axis comprises in detail a reference ring 71 and a gauge ring 6 connected to a wire strain gauge 5, the said parts being mounted onto the thin-walled sleeve area of the valve housing 1. Exciter ring 8 is arranged equally coaxially relative to the sensor element 2 and spaced from the pressure control valve 9 by the air gap. The exciter ring 8 along with the signal-receiving and exciter assembly 3 forms a construction unit which is arranged in the cover 10 spaced from the pressure control valve 9. In the exciter ring Ii, the signal-receiving and exciter assembly 3 induces a voltage which is conducted through the reference ring 7 to a certain extent and through the gauge ring 6 to the wire strain gauge 5 to another extent. The reference ring 7 and the gauge ring 6, in turn, induce magnetic fields which are received by way of the exciter ring 8. The field induction in the exciter ring 8 causes the circulation of an alternating current through the ring. Induced current also passes through the gauge ring 6 and reference ring 7 so that the thus produced magnetic fields of the rings 6, 7 can be sensed by means of appropriate sensor elements, for example, by means of Hall elements. Consequently, two sensor signals are available that allow to determine the deformation of the valve housing 1 and, thus, the pressure prevailing in the pressure control valve 9.

An arrangement of this type is suited especially for electrohydraulic brake systems necessitating a large number of sensor elements 2 which may be accommodated between the valve-accommodating member 14 and a cover 10 that includes the controlling and regulating electronics 13 and is seated on the valve-accommodating member 14. Another case of application is for traction slip and driving dynamics control systems in automotive vehicle brake systems.

What is claimed is:

1. Pressure control valve with integrated pressure sensor, comprising:
   a valve member arranged in a valve housing,
   a sensor element for generating an output signal that is a function of a fluid pressure reaction of the valve housing, wherein the fluid pressure reaction of the valve housing is determined by the sensor element by using the sensor to detect a deformation of the valve housing,
   further including a signal-receiving and exciter assembly and wherein said sensor element is attached to said valve housing and is wirelessly connected to said signal-receiving and exciter assembly,
   wherein the signal-receiving and exciter assembly couples an electric signal into said sensor element by way of a receiving circuit integrated in the sensor element.

2. Pressure control valve as claimed in claim 1, wherein the sensor element or the signal-receiving and exciter assembly includes a compensating circuit to stabilize the signal strength of the output signal of the sensor element.

3. Pressure control valve as claimed in claim 1, wherein the sensor element includes a gauge element and a reference circuit having a reference output signal, and wherein an output signal of the gauge element is combined with the reference output signal to comprise the sensor element output signal.

4. Pressure control valve as claimed in claim 1, wherein the valve housing includes an area made from a thin walled sleeve and wherein the sensor element is arranged on said thin-walled sleeve.

5. Pressure control valve as claimed in claim 4, wherein the sensor element includes a gauge ring, a reference ring, and a wire strain gauge.

6. Pressure control valve as claimed in claim 5, further including an exciter ring coaxially aligned with said gauge ring and said reference ring.

7. Pressure control valve as claimed in claim 6, further including a cover which accommodates a controlling or regulating electronics that is required for the operation of the pressure control valve and is electrically and mechanically connected to several electric contacts of a valve coil of the valve member.

8. Pressure control valve as claimed in claim 7, wherein the valve coil, the controlling or regulating electronics, and a signal-receiving and exciter assembly are combined to form a prefabricated subassembly in the cover.

9. Pressure control valve with integrated pressure sensor, comprising:
   a valve member arranged in a valve housing,
   a sensor element for generating an output signal that is a function of a fluid pressure reaction of the valve housing, wherein the fluid pressure reaction of the valve housing is determined by the sensor element by using the sensor to detect a deformation of the valve housing,
   wherein the sensor element includes a gauge ring, a reference ring, and a wire strain gauge.

* * * * *